United States Patent [19]
Kume et al.

[11] Patent Number: 5,565,948
[45] Date of Patent: Oct. 15, 1996

[54] CAMERA

[75] Inventors: Hideaki Kume, Hachioji; Gouichi Hiratsuka, Sagamihara, both of Japan

[73] Assignee: Olympus Optical Co., Ltd., Tokyo, Japan

[21] Appl. No.: 945,848

[22] Filed: Sep. 16, 1992

[30] Foreign Application Priority Data

Sep. 27, 1991 [JP] Japan .................................. 3-249400

[51] Int. Cl.⁶ ...................... G03B 13/10; G03B 13/02; G03B 13/14; G03B 17/02
[52] U.S. Cl. ...................... 396/377; 396/379; 396/435; 396/378
[58] Field of Search ................................. 354/159, 219, 354/222, 221, 94

[56] References Cited

U.S. PATENT DOCUMENTS

| | | | |
|---|---|---|---|
| Re. 32,797 | 12/1988 | Harvey | 354/481 |
| 4,652,104 | 3/1987 | Harvey | 354/106 |
| 4,697,901 | 10/1987 | Wakabayashi et al. | 354/221 |
| 5,014,078 | 5/1991 | Kudo et al. | 354/195.1 |
| 5,021,815 | 6/1991 | Harvey | 354/222 |
| 5,059,993 | 10/1991 | Harvey | 354/222 |
| 5,066,971 | 11/1991 | Kodaira | 354/465 |
| 5,086,311 | 2/1992 | Naka et al. | 354/195.1 |
| 5,160,954 | 11/1992 | Suzuki et al. | 354/221 |
| 5,255,030 | 10/1993 | Mukai et al. | 354/94 |
| 5,257,055 | 10/1993 | Cho et al. | 354/222 |

FOREIGN PATENT DOCUMENTS

| | | |
|---|---|---|
| 0423844 | 4/1991 | European Pat. Off. . |
| 25058 | 1/1960 | Japan . |
| 1-107240 | 4/1989 | Japan . |
| 1-207731 | 7/1989 | Japan . |
| 2170149 | 6/1990 | Japan . |

*Primary Examiner*—Michael L. Gellner
*Assistant Examiner*—Nicholas J. Tuccillo
*Attorney, Agent, or Firm*—Louis Weinstein

[57] ABSTRACT

In a camera according to the present invention, a parallax correction indicator for normal-size photography and a parallax correction indicator for panorama-size photography, which are formed on an image formation plane of a finder optical system, are separately displayed in a finder image display screen set in N photographing mode and in a finder image display screen set in P photographing mode. Therefore, using the camera or the present invention, the finder display will not be complicated but be easy to see during N size photography and panorama-size photography alike. This reduces occurrence of a photographic error.

48 Claims, 13 Drawing Sheets

CAMERA

BACKGROUND OF THE INVENTION

1. Field of the Invention

The present invention relates to a camera, or more particularly, to a finder parallax correction indication for a camera capable of switching the picture size.

2. Description of the Related Art

A camera capable of switching photographed picture sizes from a full size or normal size (hereafter. N size) to a hair size (hereafter H size) has been described as a camera having a photographic plane switching unit disclosed in Japanese Utility Model Examined Publication No. 35-25058. Synchronously with picture size switching, the camera can switch the finder visual field frame from a normal size to an H size.

In a camera currently being commercialized or a popular 35-mm camera, photographed picture sizes are switched from a normal size or 24 mm by 36 mm to a size having a smaller length or about 13 mm by 36 mm, then a pseudo panorama-size (hereafter, P size) picture is produced. Even in this kind or camera, when picture sizes are switched as mentioned above, the size of a finder visual field frame are switched from a normal size to a size corresponding to a P-size picture at the same time. A photographing apparatus disclosed in Japanese Patent Laid-Open Application No. 1-107240 varies the size of a finder visual field frame with the variation of a Focal length of a photographing optical system.

However, in the foregoing examples of prior art including the camera disclosed in Japanese Utility Model Examined Publication No. 35-25058 and the photographing apparatus disclosed in Japanese Patent Laid-Open Application No.1-107240, although a photographing optical system and a finder optical system are installed separately, a parallax between the visual field ranges for a photographed picture and for a Finder image in these optical systems is not taken into consideration to ensure user-friendly photography.

When a finder visual field frame is made smaller to coincide with a photographed picture reduced as a result of photographed picture size switching, a parallax which is normally negligible or very small relative to the size of the visual frame remains almost the same even when the visual field frame becomes smaller. Therefore, the parallax becomes no longer negligible.

For example, in a camera permitting the foregoing pseudo P-size picture, when the N-size picture is switched to the P-size picture, the longitudinal dimension of the visual field frame is almost halved. This doubles the parallax of the visual field frame. Currently, the P-size picture is about 13 mm high by 36 mm wide. If the P-size picture is reduced to 10 mm by 26 mm, the parallax becomes 2.4 times larger. In particular, influence of the increasing parallax is significant for near photography.

To correct the parallax, a parallax correction indicator must be installed to indicate the position of the parallax in the visual field frame. The parallax correction indicator is a line that marks the position of a parallax between the upper parts of a photographic range of a photographed picture and a finder visual field frame within the finder visual field frame. For near photography, in particular, a photographer looks at the indicator to check the parallax of a finder and carries out photography.

For example, FIGS. 27 and 28 show photographed pictures of a conventional camera permitting picture size switching. Herein, an N size is 23 mm by 36 mm and a P size is 13 mm by 36 mm respectively. Hereafter, photography for N-size pictures will be referred to as N photography, while photography for P-size pictures will be referred to as P photography.

FIG. 27 shows an N-size picture 100 or a visual field for N photography. FIG. 28 shows a P-size picture 101 or a visual field for P photography that is the N-size picture 100 shown in FIG. 27 whose upper and lower parts are masked. FIGS. 29 and 30 show finder image display screens corresponding to FIGS. 27 and 28. FIG. 29 shows a finder visual field frame 100a for normal photography that corresponds to the N-size picture. FIG. 30 shows a finder visual field frame 101a or P photography that corresponds to the P-size picture. When the aforesaid conventional camera is used, as shown in FIG. 29, a parallax correction mark 100b serving as a parallax correction indicator normal photography or photography for an N-size picture and a parallax correction mark 101b for P photography that is unnecessary for normal photography are displayed in the finder visual field frame 100a corresponding to the P-size picture.

As described so far, in the conventional camera, even when normal photography for a N-size picture is to be carried out, the parallax correction indicator for P photography is displayed in the finder. This not only inconveniences a photographer but also induces an error in his/her determining a composition.

OBJECTS AND SUMMARY OF THE INVENTION

The object of the present invention is to solve the aforesaid drawbacks or to provide a camera for displaying in a finder visual field frame an N-size photography indicator alone during photography for a certain photographed picture size; such as. N photography or a P-size photography indicator alone during photography for a different photographed picture size; such as. P photography, thus providing an easy-to-see finder during photography for either of the sizes, and eventually minimizing occurrence of a photographic error.

The present invention provides a camera capable of switching photographed picture sizes, comprising a finder optical system capable of varying magnifications when photographed picture sizes are switched, a finder visual field frame placed on an image formation plane of the finder optical system, an indicator created on the image formation plane, and a visual field frame switching mechanism for varying the dimensions of the finder visual field frame when photographed picture sizes are switched.

Then, in the foregoing camera, when photographed picture sizes are switched, the visual field frame switching mechanism varies the longitudinal dimension of the finder visual field frame and/or the lateral dimension of the finder visual field frame. Then, the indicator for a corresponding photographic size; such as, a finder parallax correction indicator is displayed within the finder visual field frame.

The other features and advantages of the present invention will be apparent in conjunction with the description below.

DETAILED DESCRIPTION OF THE PREFERRED EMBODIMENT

Figure 1:
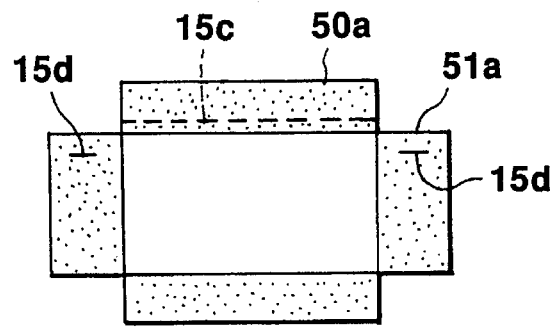
FIG. 1 shows finder visual field frames for N photography and P photography in a camera of a first embodiment of the present invention.

The present invention will be described in conjunction with embodiments shown in the drawings.

A camera of an embodiment of the present invention is capable of switching photographed picture sizes. The photographed picture size can be switched to an N size or a P size. Prior to detailing the structure of the camera, a finder image display screen available when the photographed screen size is switched to the N size or P size will be described.

FIG. 1 relates to a camera of the present embodiment whose photographed picture size can be switched to an N size or a P size, wherein a finder visual field frame 50a for N photography and a finder visual field frame 51a for P photography are overlapped, in FIG. 1, 15c and 15d denote correction marks or parallax correction indicators for N photography and P photography.

Figure 2:
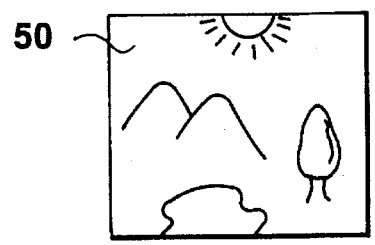
FIG. 2 shows a finder image display screen for N photography for the camera of FIG. 1.
Figure 3:
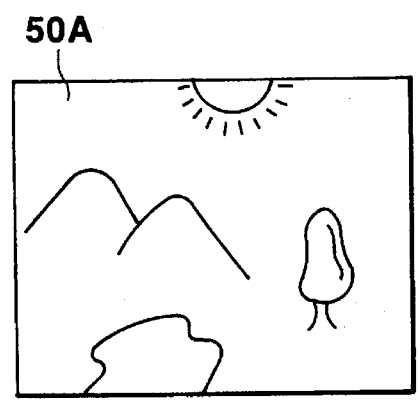
FIG. 3 shows an enlarged finder image formation plane for P photography for the camera of FIG. 1.

FIGS. 2 and 3 show finder image screens corresponding to photographed picture sizes for the camera. FIG. 2 shows a finder image display screen 50 corresponding to a visual field frame for N photography. FIG. 3 shows an unmasked finder image formation plane 50A in which when P photography is selected, then a finder lens is driven by a zoom finder mechanism to enlarge a finder image.

Figure 4:
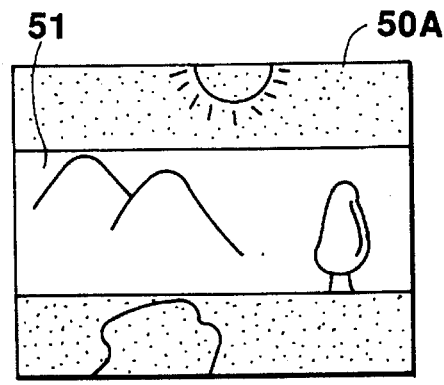
FIG. 4 shows a finder image display screen for P photography for the camera of FIG. 1.

FIG. 4 shows a masked finder image display screen 51 in which visual field masks (See visual field masks 16 and 16A in FIG. 9) are moved on the finder image formation plane 50A for P photography in order to set the angle of visibility for P photography. The finder image display screen 51 corresponds to the finder visual field frame 51a of FIG. 1. The finder image display screen 50 of FIG. 2 corresponds to the finder visual field frame 50a of FIG. 1.

As shown in FIG. 1, the finder visual field frame 51a for P photography is a visual field frame produced by cutting off the upper and lower invisible portions of the finder visual field frame for N photography 50a and enlarging the width of the finder visual field frame 50a. Therefore, in this camera, a parallax correction mark 15d for P photography is not displayed in the finder visual field-frame 50a for N photography. Then, a parallax correction mark 15d alone is displayed in the finder during P photography.

In other words, the finder visual field frame is modified so that it presents first and second different size viewable visual fields (finder visual field frame 51a for P photography and finder visual field frame 50a for N photography). In addition to presenting first and second different size viewable visual fields, the finder optical system presents first and second respective sets of indicators. The first set of indicators 15d is viewable when the first viewable visual field 51a is presented, and the second set of indicators 15c is viewable when the second viewable visual field 50a is presented. The first and second sets of indicators 15d, 15c are blocked so that the first set of indicators 15d is not viewable when the second viewable visual field 50a is presented, and the second set of indicators 15c is not viewable when the first viewable visual field 51a is presented.

The viewable visual fields 51a, 50a have different sizes. The viewable visual field is defined the whole visual field, i.e., the whole area that can be seen by the photographer looking through the finder optical system.

First, the structure of a camera of the first embodiment of the present invention will be described briefly.

Figure 5:
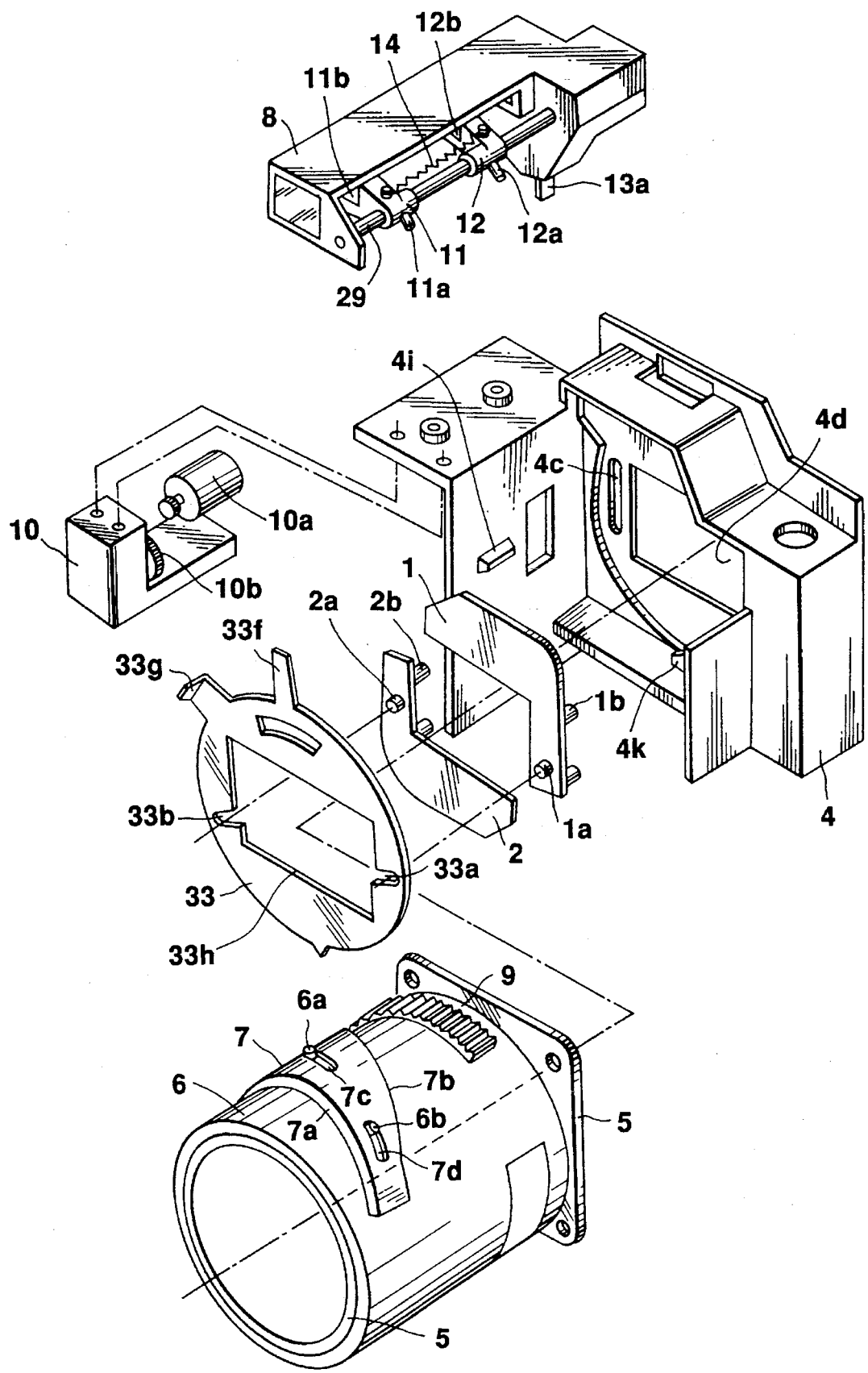
FIG. 5 is an exploded perspective view of the camera of FIG. 1.

FIG. 5 is an exploded perspective of the camera of this embodiment. This camera is formed mostly of a camera body 4, a lens barrel part which is a magnification variable photographing optical system, a finder unit having a finder optical system and finder visual field frame switching mechanism, a zooming motor unit 10 and a photographed picture size switching mechanism part. By the way, the photographed picture size switching in the general camera is to switch a picture of the normal size (so called full size of 24 mm×36 mm and called the N size hereinafter) at the time of the panorama photographing (called the P photographing hereinafter) mode to a picture of the half size at the time of the half size photographing or a picture of the panorama size (13 mm×36 mm and called the P size hereinafter) at the time of the panorama photographing (called the P photographing hereafter) mode. In the case of this camera, a full size picture at the time of the N photographing can be switched to a panorama size picture at the time of the P photographing or vice versa.

The zooming motor unit 10 is supported by the body 4 and is formed of a zooming motor 10a and gear train 10b.

The lens barrel part is formed of a fixed frame 5, a cam ring 6 rotatably supported by the fixed frame 5 and a photographing lens not illustrated. On the outer periphery of the cam ring 6, a finder cam 7 having first and second regions are arranged rotatably in the peripheral direction as guided by pins 6a and 6b. A gear 9 meshing with the above mentioned gear train 10b is secured to the cam ring 6. By the way, the finder cam 7 is held to be switchable to two relative positions corresponding to the N photographing and P photographing modes with respect to the cam ring 6. The relative positions are switched by butting the cam 7 against stoppers 4i and 4k of the body 5 and displacing the holding positions.

The finder unit is formed of a finder body 8, a guide shaft 29 supported by the body 8, finder lens F frames 11 and 12 slidably supported by the shaft 29, finder magnification varying lenses 11b and 12b held by the frames 11 and 12, a visual field mask operating switching ring 13, and F frame spring 14 hung on each of the frames 11 and 12, a Porro prism not illustrated in FIG. 5, a visual field mask and an eyepiece. The finder body 8 is fitted to the camera body 4.

The photographed picture size switching mechanism part is arranged in the front surface part of a standard mask opening 4d of the camera body 4 and is formed of photographed picture size switching movable masks 1 and 2 and a P ring 33 operating these masks. By the way, the masks 1 and 2 can be moved to the respective picture size switching positions by respective guide pins 1b and 2b guided in a straight advancing guide groove 4c of the body 4.

When an operating arm 33f is operated, the above mentioned P ring 33 will move the above mentioned masks 1 and 2 to the respective picture size switching positions through the masks 1 and 2 driving pins 1a and 2a fitting in incisions 33a and 33b provided on the inner periphery of ring 33. The P ring 33 is regulated in the rotating position by the body 4. This regulated position gives photographed picture sizes corresponding to the N photographing and P photographing of the masks 1 and 2.

The summary of the operation of this camera formed as in the above shall be explained. First of all, the cam ring 6 is rotated by the zooming motor 10a on the basis of a zoom controlling signal to make a zooming operation of the camera. Also, on the basis of the zooming operation, the F frames 11 and 12 of the finder unit are driven in the optical axial direction by the finder cam 7 to zoom the finder optical system. In switching the photographed picture size, in order to make an N photographing mode, the P ring 33 is rotated counter-clockwise (called CCW hereinafter) to vertically open the masks 1 and 2 to make an N size picture. In order to set a P photographing mode, the P ring 33 is rotated clockwise (called CW hereinafter) to move the masks 1 and 2 to approach each other to make a P size picture. A driving arm 33g presses an operating arm 13a of the visual field mask switching ring 13 of the above mentioned finder unit and gives a finder visual field frame corresponding to the above mentioned photographed picture size.

Figure 18:
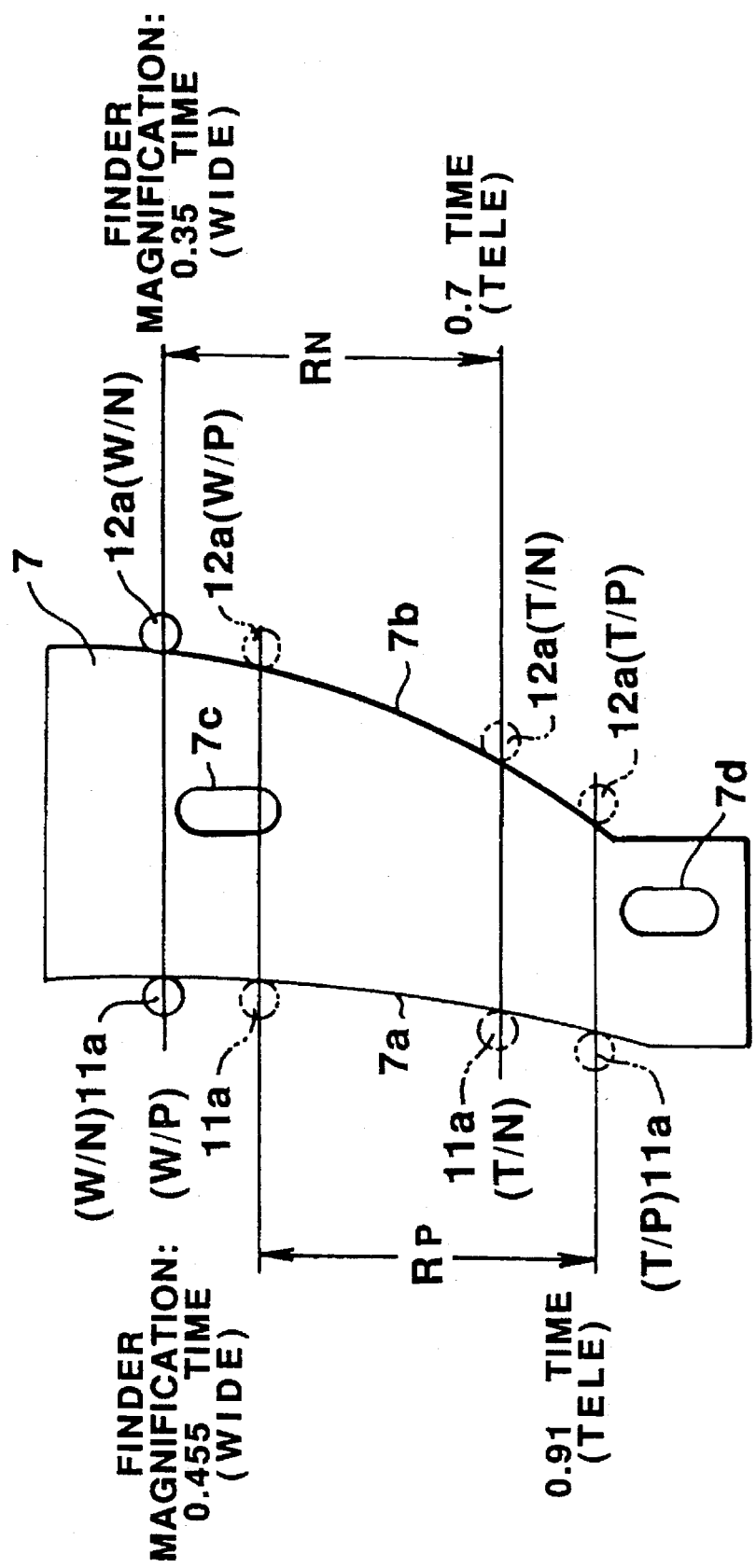
FIG. 18 is a development showing the relative positions of the finder cam and cam pin in N and P photographing modes for the camera of FIG. 1.

Also, the relative positions of the cam ring 6 and finder cam 7 are switched In response to the switching of the above mentioned photographed picture size. That is to say, the cam ring 6 is rotated CCW or CW, the finder cam 7 is butted against the stoppers 4i and 4k and the relative position with the cam ring 6 is set as displaced to the N photographing mode and P photographing mode positions. Therefore, the regions in which the cam pins 11a and 12a of the F frames 11 and 12 of the finder unit are in sliding contact with the cam surfaces 7a and 7b of the finder cam 7 will be different. Thus, at the time of the N photographing, the first region will be used and, at the time of the P photographing, the second region will be used. The first and second regions are formed as continued on the cam surfaces 7a and 7b (FIG. 18).

Figure 30:
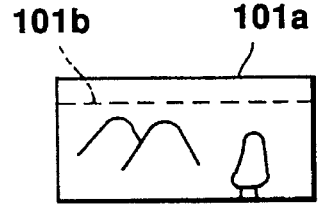
FIG. 30 shows a finder image display screen during P photography for the camera of FIG. 27.

As in the above, in this camera, the finder visual field frame size is switched in response to the switching of the photographed picture size in the N photographing and P photographing, at the same time, the value of the magnification varying rate of the finder is altered and particularly, at the time of the P photographing, the magnification can be elevated to prevent the finder from becoming hard to see. For example, the finder visual field frame at the time of the P photographing will not be the visual field frame 101a as in the prior art example shown in FIG. 30 but will be the visual field frame 51a shown in FIG. 1.

Figure 6:
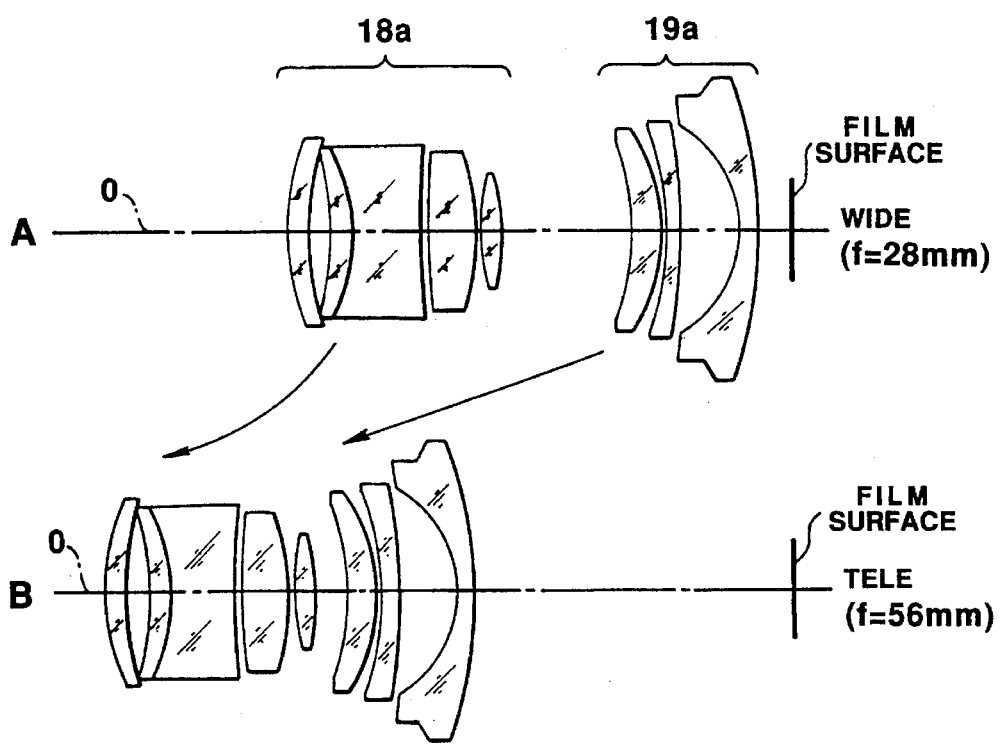
FIG. 6 shows the zooming state of a photographing optical system for the camera of FIG. 1.
Figure 7:
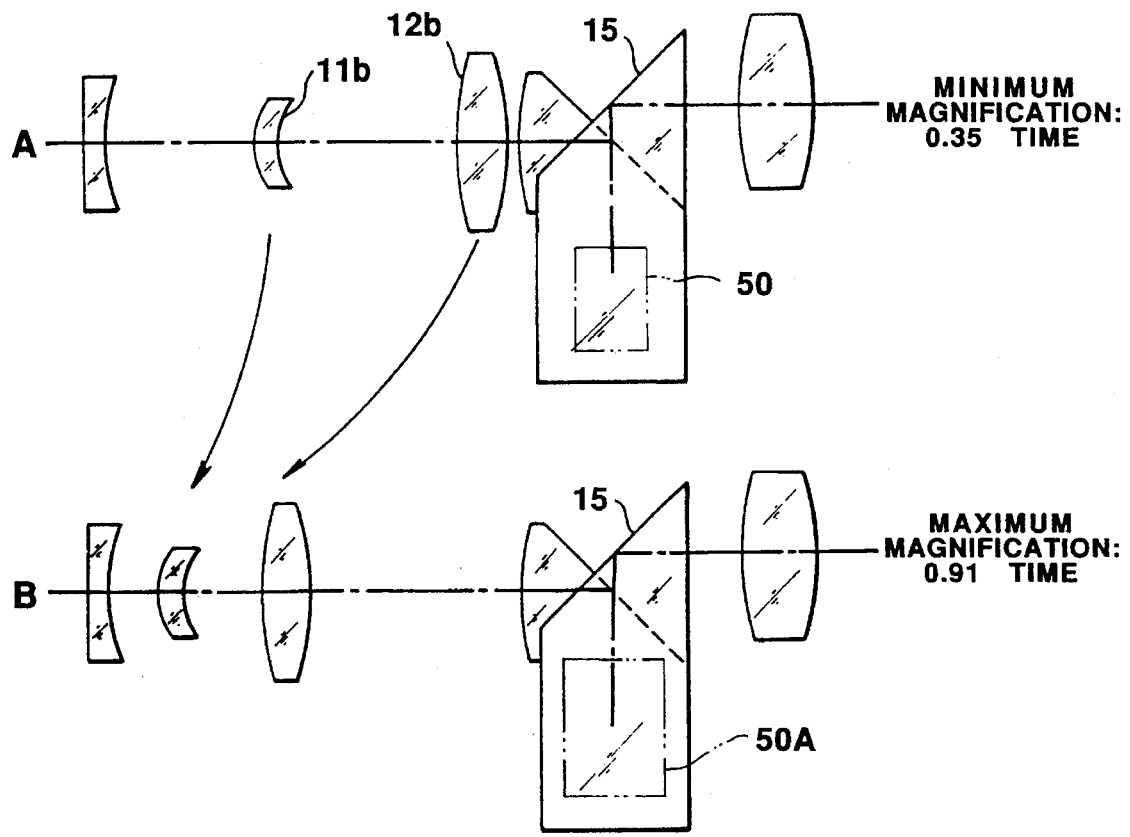
FIG. 7 shows the zooming state of a finder optical system for the camera of FIG. 1.

FIGS. 6 and 7 show the zooming operation states of the above mentioned photographing lens and a finder magnification varying lens. FIG. 6 shows the paying out positions in the wide state (A) and tele state (8) of the first group lens 18a and second group lens 19a which are photographing lenses. The respective focal lengths f are 28 mm and 88 mm. The magnification varying rate is 2.

On the other hand, FIG. 7 shows a zooming state of a finder optical system and shows the paying out positions in the wide state (A) and tele state (B) of the finder magnification varying lenses 11b and 12b. The range of the magnification varying rate is made 0.38 to 0.91. Therefore, the total magnification varying rate will be 2.6. However, the range of the magnification variation corresponding to the finder cam first region for the N photographing is 0.35 to 0.7 and the range of the magnification variation corresponding to the second region for the P photographing is 0.485 to 0.91. Therefore, simultaneously with the increase of the finder magnification, the visual field frame at the time of the P photographing will have to be expanded as in the visual field frame 51a shown in FIG. 1.

The main formation of the above mentioned lens barrel shall be explained in the following with reference to FIG. 8.

Figure 8:
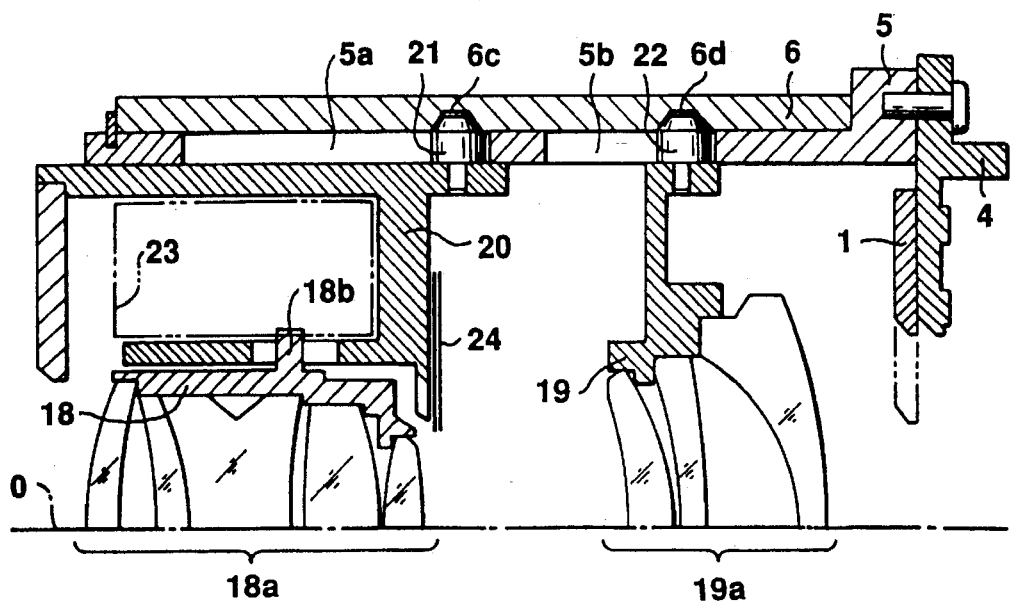
FIG. 8 shows a longitudinal cross section of a main section of a photographing lens barrel for the camera of FIG. 1.

This lens barrel is a zoom lens barrel of a focal length of 28 to 56 mm, and is formed of two groups of lenses and is formed, as shown in FIG. 8, of a moving frame 20 slidably fitted within the fixed frame 5, a first group frame 18 holding a first group lens 18a supported by the moving frame 20 and a second group frame 19 holding a second group lens 19a. The frames 18 and 19 are moved in the direction of the optical axis O by driving the cam pins 21 and 22 respectively secured to the moving frame 20 and the frame 18 with the cams 6c and 6d of the rotating cam ring 6. By the way, the cam pins 21 and 22 are guided in the optical axial direction O by straight advancing grooves 5a and 5b in the fixed frame 5.

A shutter blade 24 is operated by a shutter focusing mechanism part 23 provided within the moving frame 20. At the same time, the first group lens 18 is driven to be focused through a driving pin 18b of the first group frame 18.

The formation of the optical system of the above mentioned finder unit shall be explained in the following with reference to FIG. 9.

Figure 9:
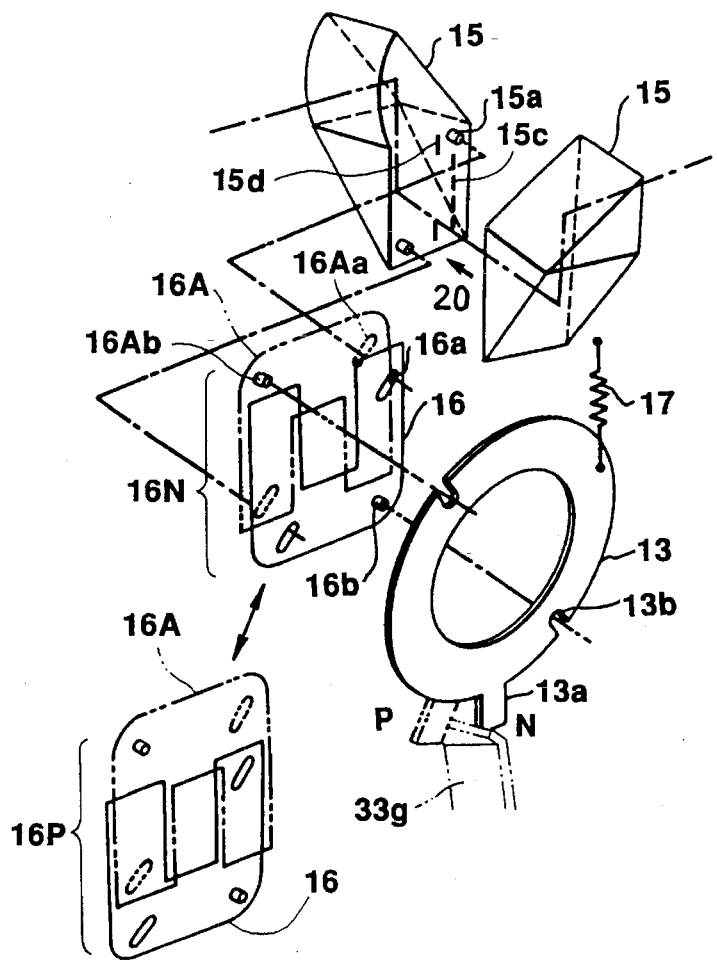
FIG. 9 is an exploded perspective view of a main section of the finder optical system for the camera of FIG. 1.

As shown in FIG. 9, a Porro prism 15 having four reflecting surfaces is separated into two bodies on the right and left and the image forming surface of the finder image forming system is positioned intermediately between them. The finder visual field mask 16 (16A) is formed of two sheets and slot parts 16a (16Aa) engage with projections 15a of the Porro prism 15 and are slidably held. Also, a visual field switching ring 13 is rotatably held in the finder body 8 (FIG. 5) and is energized in the CCW direction by a visual field spring 17. When the P ring 33 shown in FIG. 5 is rotated in the CW direction by the P photographing switching operation, the driving arm 33g of the P ring 33 will press the arm part 13a of the visual field switching ring 13 and will rotate the visual field switching ring 13 in the CW direction against the visual field spring 17. At this time, the U groove 13b of the visual field switching ring 13 will engage with the projection 16b (16Ab) of the visual field mask 16 (16A), therefore, the visual field mask 16 (16A) will move in the lengthwise direction of the slot 16a (16Aa) and the visual field frame size will be switched.

The picture size switching mechanism of this camera shall be explained in detail in the following switch reference to FIGS. 10 to 13.

Figure 11:
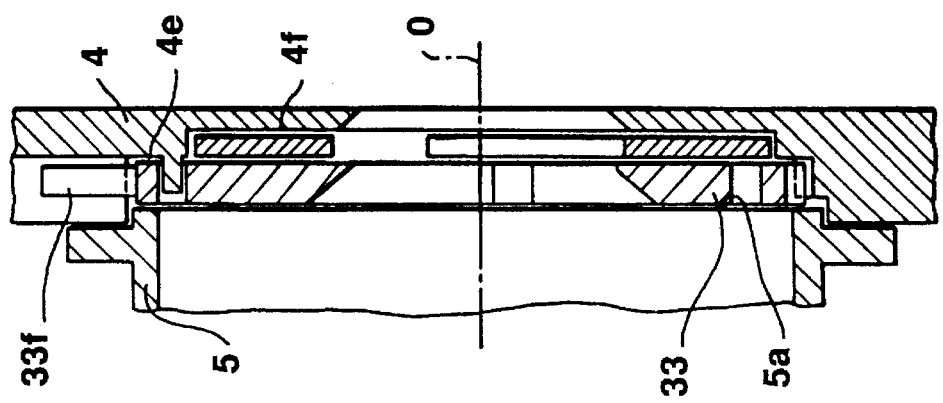
FIG. 11 is a sectional view of the switching mechanism of FIG. 10 looking in the direction of arrows 11—11.
Figure 10:
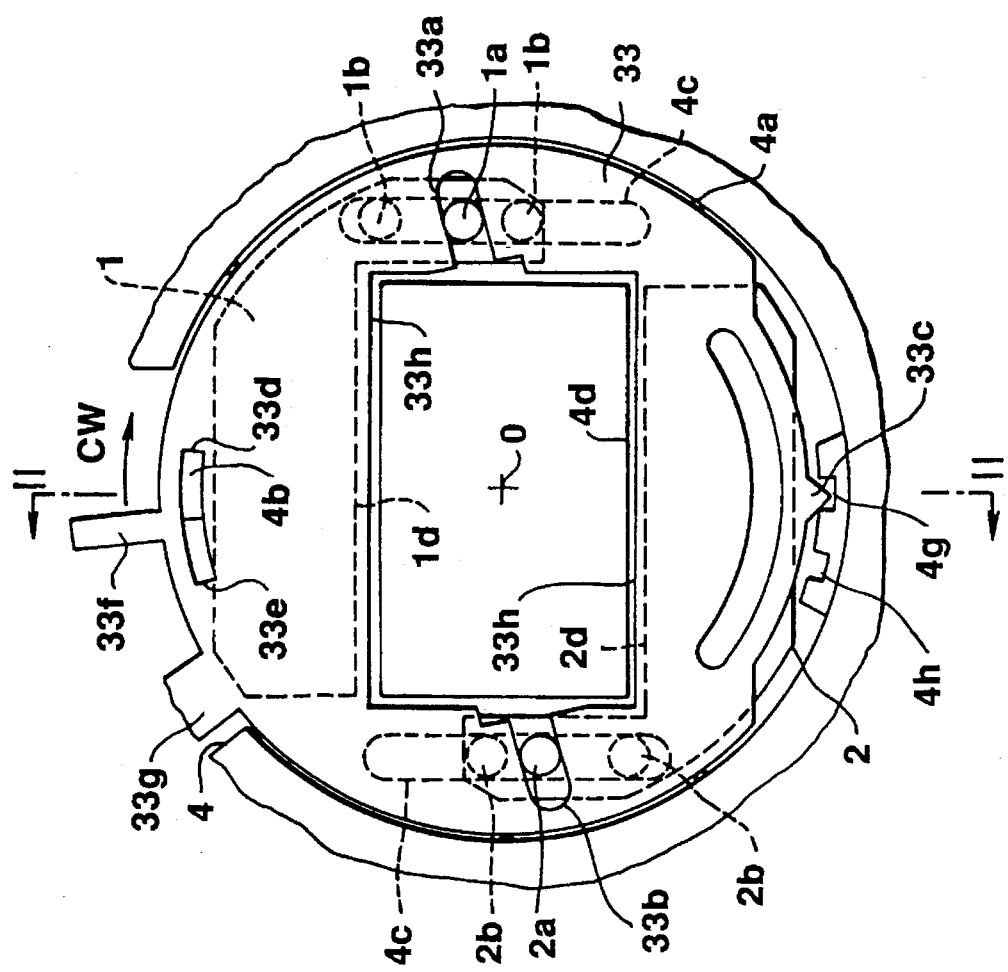
FIG. 10 is a front view of a picture size switching mechanism in N photographing mode for the camera of FIG. 1.
Figure 13:
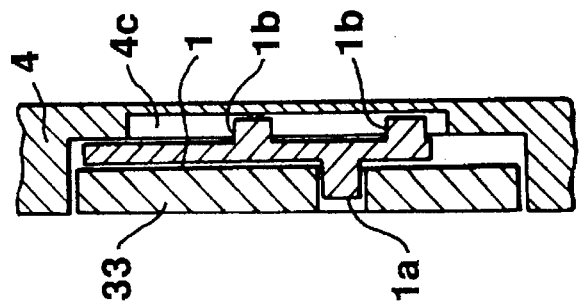
FIG. 13 is a cross-sectional view of the switching mechanism of FIG. 12 looking in the direction of arrows 13—13.
Figure 12:
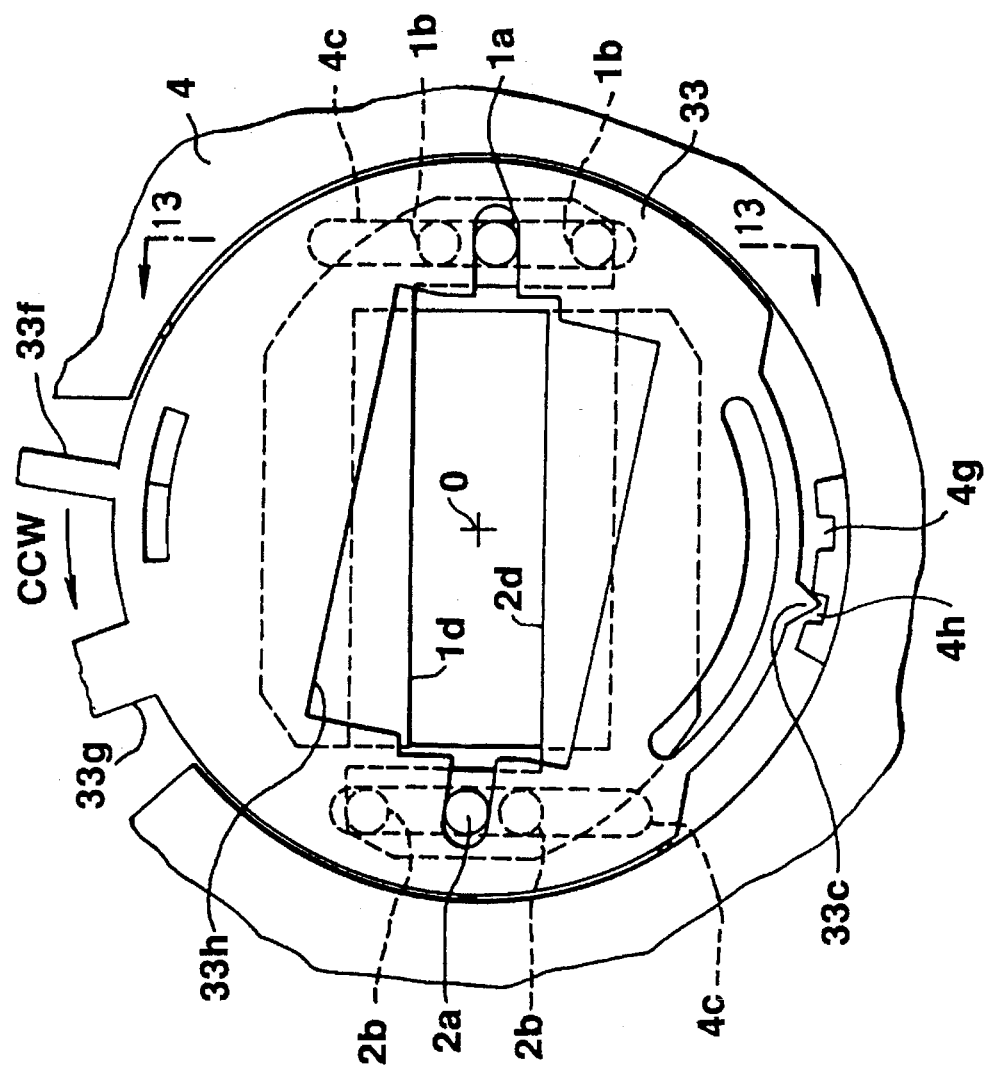
FIG. 12 is a front view of the picture size switching mechanism in P photographing mode for the camera of FIG. 10.

FIG. 10 is an elevation of the picture size switching mechanism part of this camera in the N photographing mode as seen from the photographed object side. FIG. 11 is a sectioned view on line 11—11 in the above mentioned FIG. 10. FIG. 12 shows an elevation of the picture size switching mechanism part in the P photographing mode. FIG. 13 is a sectioned view on line 13—13 in FIG. 12.

The above mentioned picture size switching mechanism part is arranged between the surface 4f of the mask part 4d of the camera body 4 and the end surface 5a of the fixed frame 5. The above mentioned switching mechanism is formed of masks 1 and 2 determining the real photographed picture size in the P photographing, a P ring 33 switching the mask position and an opening 4d of the body 4 determining the N size of a real picture in the N photographing. The P ring 33 and masks 1 and 2 are regulated in the axial direction by the end surface 5a of the fixed frame 5 and the P ring receiving surface 4e of the body 4. The P ring 33 is rotatably held by the outer peripheral receiving part 4a.

The masks 1 and 2 have pins 1b and 2b for guides in moving and fitted in the straight advancing guide grooves 4c, 4c. The driving pins 1a and 2a provided in those masks are fitted in the incised grooves 33a and 33b. Further, the P ring 33 has contact surfaces 33e and 33d with which the stopper 4b of the body 4 is in contact to determine the N and P photographing positions. The clicking projection 33c of the P ring 33 fits in the clicking groove 4g or 4h of the body 4, has a clicking holding force and is held in the above mentioned P and N photographing positions.

The operation of the picture size switching mechanism shall be explained in the following.

In the N photographing mode in FIG. 10, the mask 1 and mask 2 are separated from each other and are positioned outside the range of the mask opening 4d and therefore the N size (full size) of the real picture will be determined by the opening 4d. Also, in this state, the contact surface 33d of the P ring is in contact with the stopper 4b and the clicking projection 33c fits in the clicking grooves 4g. When the P ring operating arm 33f is rotated in the CW direction from this position, the pins 1a and 2a of the masks 1 and 2 will be driven by the incised grooved 33a and 33b of the P ring 33 and the masks 1 and 2 will move downward or upward along the guide grooves 4c of the body 4. When further rotated, the contact surface 33e will contact the stopper 4b, the P ring 33 will be positioned in the P photographing mode position shown in FIG. 12 and the clicking projection 33c will fit in the clicking groove 4h. In this state, the masks 1 and 2 will approach each other and will form areas of the real picture size of the P size (panorama size) with the respective end surfaces 1d and 2d.

By the way, in order to return to the N photographing mode state again, the operating arm 33f of the P ring 33 is rotated CCW so that the state in FIG. 10 may be returned. Also, in this embodiment, the shape of the opening 33h in the center of the P ring has necessary minimum dimensions not smaller than of the body opening 4d so as to shield unnecessary light as much as possible.

The magnification varying mechanism of the finder optical system operatively connected with the zooming and picture size switching operations of the camera of this embodiment shall be explained in the following.

Figure 14:
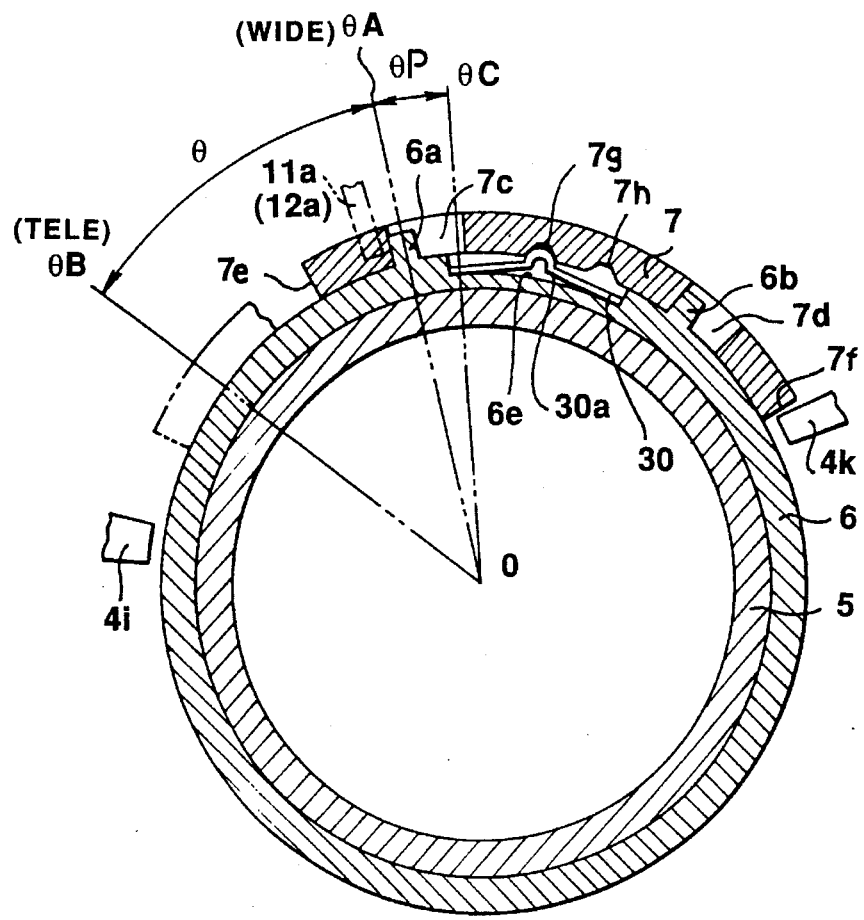
FIG. 14 is a longitudinal cross-sectional diagram showing the relative positions of a cam ring and a finder cam in N photographing mode for the camera of FIG. 1.
Figure 15:
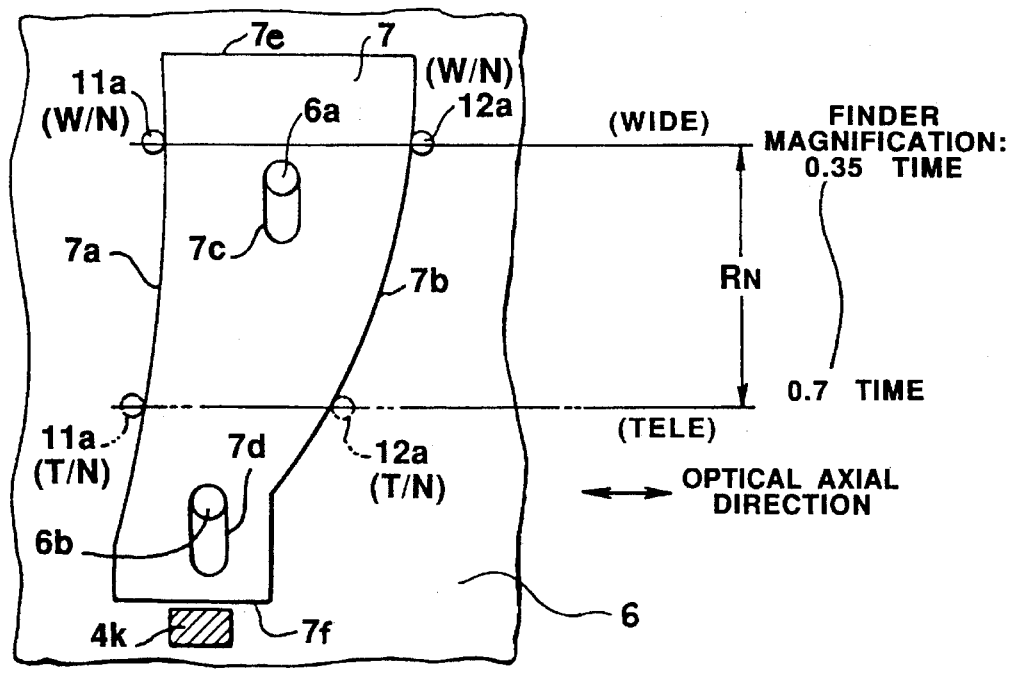
FIG. 15 is a development of the finder cam of FIG. 14.
Figure 16:
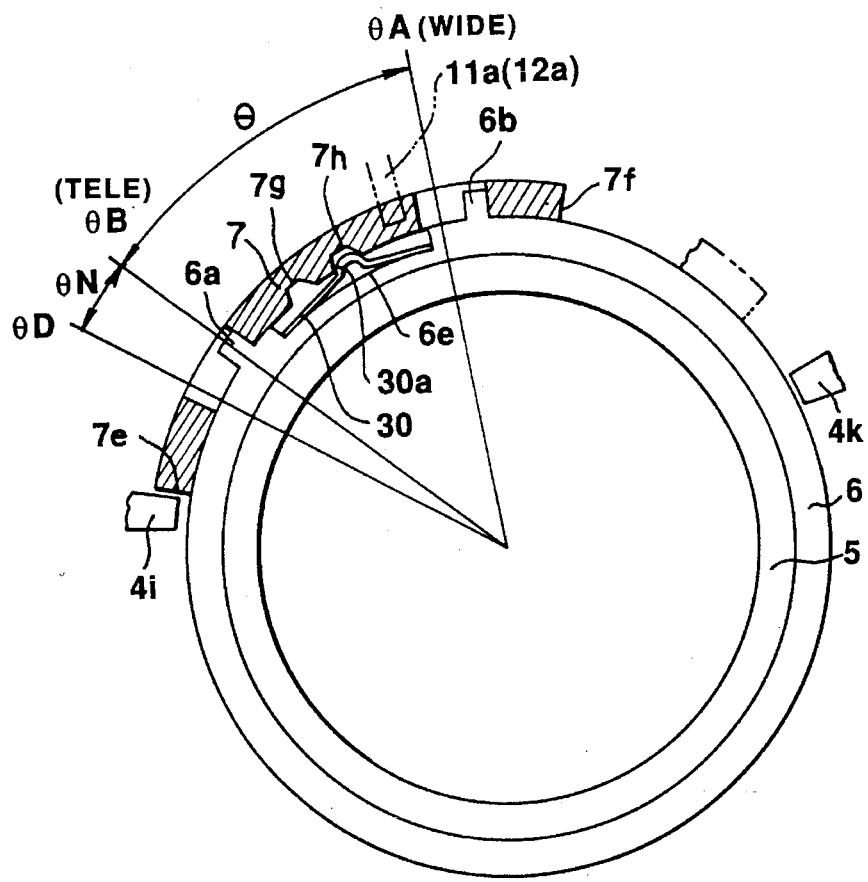
FIG. 16 is a longitudinal cross-sectional diagram showing the relative positions of the cam ring and finder cam in P photographing mode for the camera or FIG. 1.
Figure 17:
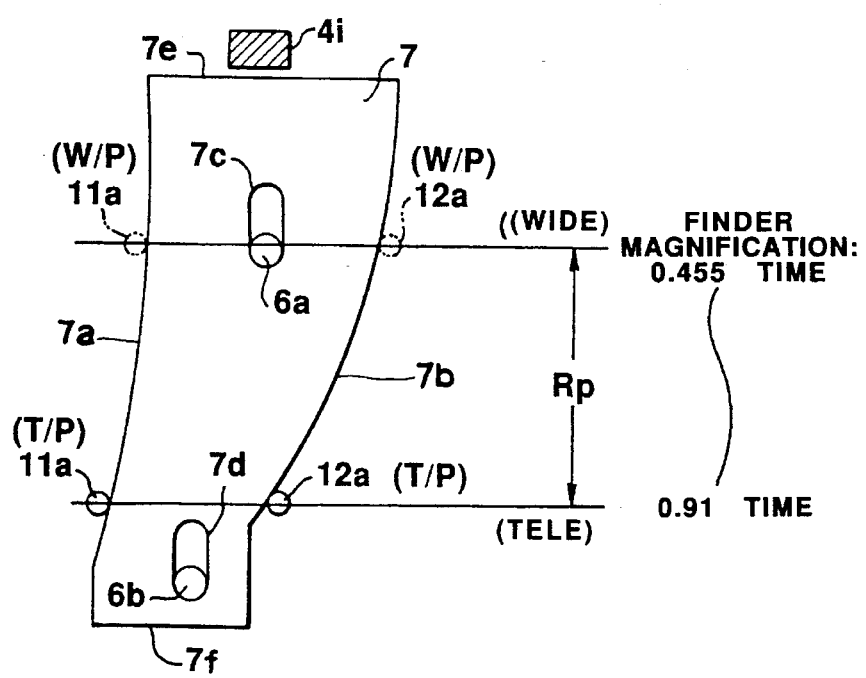
FIG. 17 is a development of the finder cam of FIG. 16.

FIGS. 14 and 15 are respectively a vertically sectioned view and developed view of the finder cam 7 and cam ring 6 in the wide state in the N photographing mode. FIGS. 16 and 17 are respectively a vertically sectioned view and developed view in the tele state in the P photographing mode. The rotatable finder cam 7 is held and arranged in either of two positions through a later described correlative position holding mechanism on the outer periphery of the cam ring 6. In the holding state as it is, in the cam ring 6 zooming rotating range θ, the finder cam 7 and cam ring 6 rotate integrally. By the way, in FIGS. 14 and 16, the cam ring 6 rotating angle θ in the N photographing mode is the guide pin 6a rotating angle which is an angle represented by the range of the wide position angle θA to the tele position angle θB.

As shown in FIGS. 14 and 15 in the N photographing mode, the cam pin 11a of the F frame 11 of the finder and the cam pin 12a of the F frame 12 are in contact respectively with the cam surfaces 7a and 7b of the finder cam 7 by the energizing force of the F frame spring 14 (See FIG. 5). By the way, the pin positions 11a and 12a (W/N) represent pin positions in the wide state in the N photographing. When the cam ring 6 is rotated to the tele position by the zooming operation, the cam pins 11a and 12a of the F frames 11 and 12 will slide while in contact with the cam surfaces 7a and 7b of the finder cam 7 to reach the pin positions 11a (T/N) and 12a (T/N). The range from the (W/N) position to (T/N) position of the pins 11a and 12a is the first region RN of the finder cam 7 used at the time of the N photographing. The finder magnification is 0.35 time to 0.7 time.

In order to switch the N photographing mode in FIG. 14 over to the P photographing mode FIG. 16, the cam ring 6 in FIG. 14 is rotated by an angle θP over the wide end to the switching rotating position θC (position of the pin 6a) to the P photographing mode. At this time, the end surface 7f of the finder cam will contact and press the stopper 4k of the camera body and therefore the finder cam 7 will be rotated and moved substantially by an angle θP with respect to the pin 6a against the holding force of the above mentioned position holding mechanism and will be positioned in the relative position of the P photographing mode state. This state is a wide state.

FIGS. 16 and 17 show a tele state of the P photographing. When the cam ring 6 is rotated to the wide side from this state, the cam pins 11a, 12a of the F frames 11 and 12 will move while in contact with the cam surfaces 7a and 7b from the 11a and 12a (T/P) positions to the 11a and 12a (W/P) positions. This range is the second region Rp of the finder cam 7 used for the P photographing. The finder magnification is of a value of 0.455 time to 0.91 time larger than in the above mentioned N photographing. By the way, as definite in FIGS. 15 and 17, the second region Rp of the finder cam 7 is formed by continuously extending the first region RN.

By the way, in order to return to the N photographing state again, as shown in FIG. 16, the cam ring 6 is rotated by the N photographing switching angle θN over the tele end, that is, to the rotating position θD. By this operation, the end surface 7e of the finder cam 7 will contact the stopper 4i of the body and further the finder cam 7 will rotate CW relative to the cam ring 6 and will be positioned in the relative position in the N photographing state. However, the position then is a tele position and, in the state shown in FIG. 14, the cam ring 6 has been driven to the wide position.

Thus, in the finder of the camera of this embodiment, the finder cam used in the prior art example are prepared in two regions and are respectively used as operatively connected with the picture size switching operation so that a finder easy to see may be made.

The relative position holding mechanism of the above described cam ring 6 and finder cam 7 shall be explained in detail in the following.

The above mentioned holding mechanism of this embodiment uses a clicking stop mechanism. As shown in FIGS. 14 and 16, clicking grooves 7g and 7h are formed in the finder cam 7. A recess 6e for holding the clicking spring 30 is formed in the cam ring 6. Further, a convex projection 30a for dropping into the clicking grooves 7g and 7h is formed in the clicking spring 30. By the way, the finder cam 7 not illustrated is regulated in the radial direction so as to be slidable on the outer periphery of the cam ring 6 and to be rotatable in the peripheral direction along the guide pins 6a and 6b.

In FIG. 14, the projection 30a of the clicking spring 30 has dropped in the clicking groove 7g and therefore, in this state, the cam ring 6 and finder cam 7 can integrally rotate. In noticing the guide pin 6a, it is found that, when the pin 6a is moved in the range of an angle θ, the wide and tele states in the N photographing state will be able to be set. When the cam ring 6 is rotated CW by an angle θP from the state in the drawing, the end surface 7f of the finder cam 7 will contact the body stopper 4k and, when further rotated, the projection 30a will drop into the clicking groove 7h and the fitting position will be switched. By this switching operation, the relative position relation of the cam ring 6 and finder cam 7 will be the P photographing cam setting state and, when the position of the guide pin 6a of the cam ring 6 is returned to θA from θC, the wide state in the P photographing will be set.

In the same manner, in the tele state of the P photographing in FIG. 16, when the cam ring 6 is rotated CCW by an angle θN, the end surface 7d of the cam 7 will contact the body stopper 4i and, as the cam ring 6 is further rotated, the finder cam 7 will rotate with the cam ring 6, the projection 30a of the spring 30 will be switched from the clicking groove 7h to drop into the clicking groove 7g and the relative position relation of the cam ring 6 and finder cam 7 will be the N photographing mode cam setting state. When the guide pin 6a of the cam ring 6 is returned to the position θB, the N photographing tele setting state will be made.

FIG. 18 shows the arrangement of the respective operating states of the cam ring 6 and finder cam 7 in FIGS. 14 and 17 and shows with what region of the cam surfaces 7a and 7b the cam pins 11a and 12a slide in contact in the respective set states. By the way, a clicking stopping mechanism is applied to the relative position holding mechanism in this embodiment but a mechanism utilizing a holding force by friction or a mechanism utilizing a holding force of a clicking action and friction action is also possible.

Figure 19:
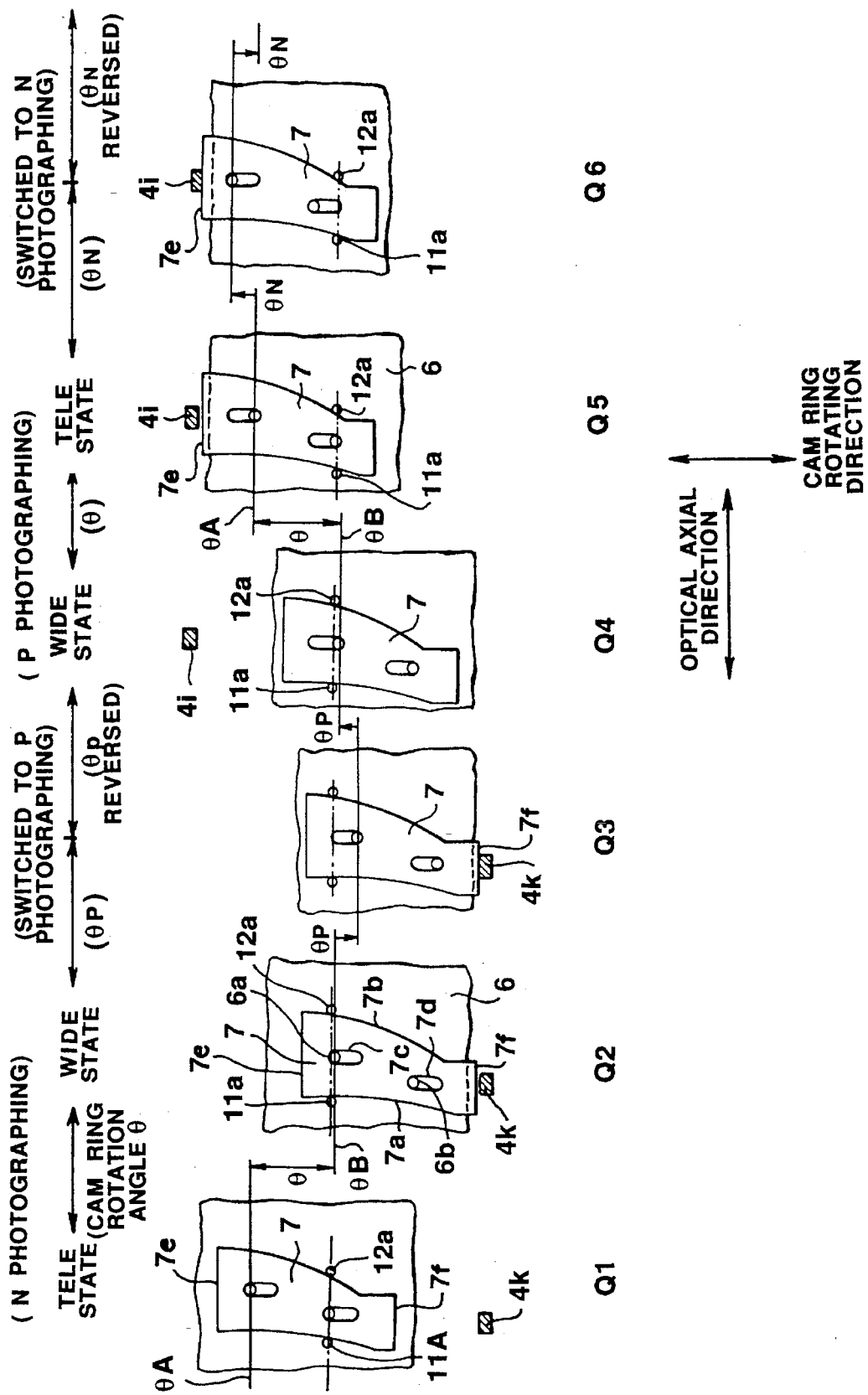
FIG. 19 is a development of operating states of the cam ring and finder cam during switching between N and P photographing modes for the camera of FIG. 1.

FIG. 19 shows by a developed view the operating state of the cam ring 6 and finder cam 7 in FIG. 18. The states Q1 to Q2 represent the positions of the cam ring 6 and finder cam 7 corresponding to the N photographing mode. The cam ring 6 carries out zooming in the angle θ between the positions θA and θB. The states Q2 to Q3 represent an operating section for switching to the P photographing state wherein the finder cam 7 is contacted with the stopper 4k and, as described above, the cam ring 6 and finder cam 7 are rotated (θP) to switch their relative positions. Thereafter, when the cam ring 6 is reversely rotated by the angle θP, the state Q4 will be made. This state is a wide state of the P photographing mode.

The states Q4 to Q5 represent the position relation state of the cam ring 6 and finder cam 7 in the P photographing mode. The cam ring 6 and finder cam 7 integrally rotate in the range of the angle θ. In the same manner, in this angle θ, any focal length can be set. The operation of the states Q5 to Q6 represents a switching operation to the N photographing mode wherein the finder cam 7 is contacted with the body stopper 4i and, as described above, the cam ring 6 and finder cam 7 are rotated (θN) to vary their relative positions.

Thereafter, when the cam ring 6 is reversely rotated by the angle θN, the above mentioned state Q1 will return. By the way, though a matter of course, if the cam ring 6 is rotated as mentioned above, the P photographing state and N photographing state will be able to be switched over to each other even from any focal length state.

By the way, the cam ring 6 is rotated on the basis of the drive of the zooming motor 10a by a controlling circuit not illustrated usually in the range of the angle θ. The cam ring 6 of angles θN and θP for switching the mode can be rotated in the same manner by the drive of the zooming motor 10a. By providing a real picture of the P ring 33 and an electric switch operatively connected with the visual field frame switching operation, the driving indication of the zooming motor 10a can be used as an angle θN driving signal switching the output of this switch to the N photographing mode or an angle θP driving signal switching to the P photographing mode.

In this embodiment, the finder magnifications in the N photographing mode and the P photographing mode are of such values as are shown in FIG. 18 and therefore the ratio of them is made 1.3. When the variation of this finder magnification is extremely small, the effect on the visual field will be naturally small. On the contrary, when the variation is extremely large, the operating amount of the visual field mask 16 shown in FIG. 9 will be made large and further the shape of the Porro prism 15 will have to be made large.

In consideration of the balance of the effect on the finder visual field and the size of the finder frame, it is suggested to set the finder magnification in the P photographing in this embodiment to be in the range of;

the finder magnification in the N photographing x (1.1 to 1.4).

As described above, in this camera, the magnification of a finder optical system is varied with switching of photographed picture sizes. Furthermore, finder visual field masks 16 and 16A are, as shown in FIG. 9, driven to a position N permitting a finder visual field for N photography or a position P permitting a finder visual field for P photography. For example, the visual field masks 16 and 16A are driven to the position P, a visual field switching ring 13 is rotated resistively to a visual field spring 17 or an energizing spring by a given angle clockwise viewed from the right side of FIG. 9 using a driving arm 33g of ring 33. With this operation, the visual field masks 16 and 16A are driven via projections 16b and 16Ab to move parallel to each other obliquely and vertically from the position N in N photographing mode to the position P in P photographing mode.

Figure 20:
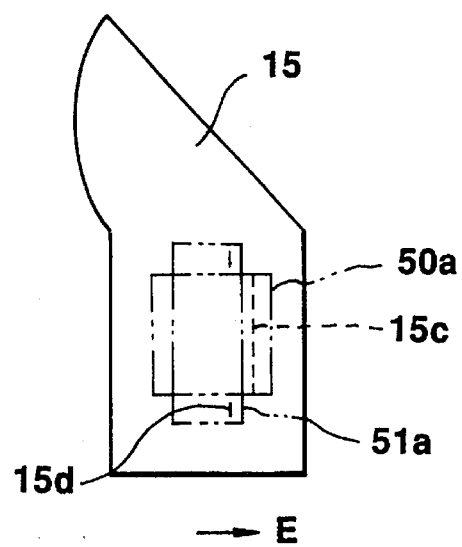
FIG. 20 is a view looking in the direction of arrow 20 of FIG. 9 and shows a finder image formation plane on a Porro prism for a camera.
Figure 21:
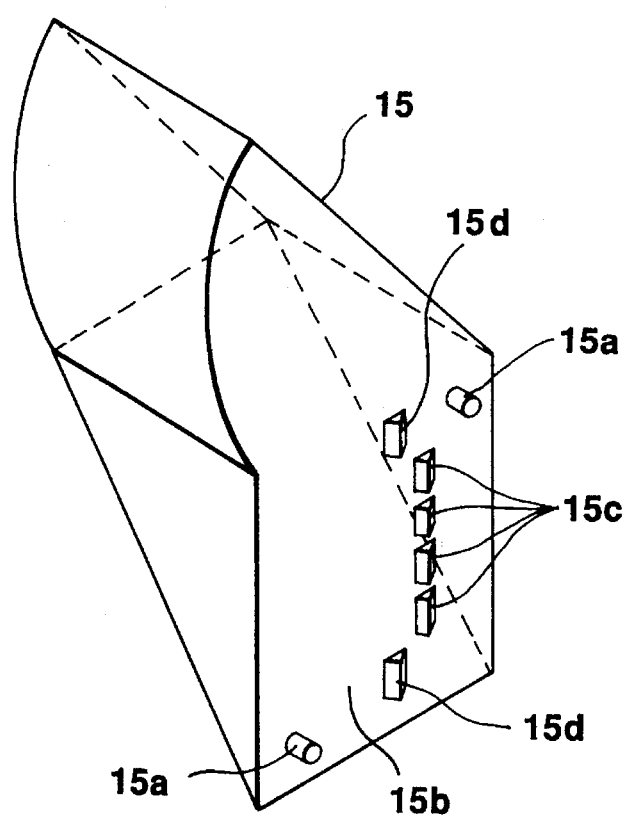
FIG. 21 is a perspective view of a Porro prism for the camera of FIG. 1.

An image formation plane 15b of a Porro prism 15 composing a finder optical system for the camera is, as shown in FIG. 20, a view looking in the direction 20 of FIG. 9, or FIG. 21, a perspective view of the Porro prism 15, provided with a correction mark 15c made up of small projections placed inside a visual field frame 50a for N photography formed with the visual field masks 16 and 16A (visual field frame formed with visual field masks placed at the position 16N in FIG. 9) and outside a visual field frame 51a for panorama-size photography. The mark 15c serves as a parallax correction indicator on a finder during N photography.

Moreover, a correction mark 15d made up of small projections lies inside a visual field frame 51a for panorama-size photography that is formed with the visual field masks 16 and 16A (visual field frame formed with the visual field masks placed at the position 16P in FIG. 9). The mark 15d serves as a parallax correction indicator on a finder during panorama-size photography. When images in FIG. 20 are observed as finder images, a direction shown by the E arrow indicates an up direction.

The foregoing marks 15c and 15d on the Porro prism 15 shown in FIG. 21 are made up of convex triangular prisms (i.e. projecting outwardly from surface 15b). The triangular prisms may also be concave.

Next, the operation of a finder optical system for the camera having the aforesaid construction for picture size switching between N photography and P photography will be described.

Figure 22:
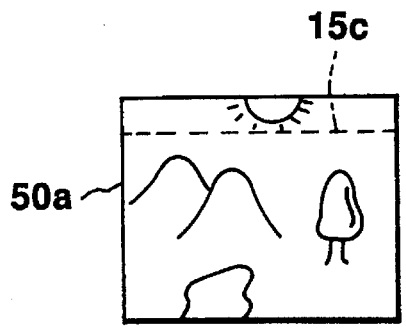
FIG. 22 shows a finder image display screen during N photography for the camera of FIG. 1.

First, when a finder optical system shown in FIG. 7 is placed in an N state N photographing mode, a visual field switching ring 13 shown in FIG. 9 is rotated counterclockwise by a visual field spring 17, and masks 16 and 16A lie at a position 16N. Therefore, on the finder image display screen, a finder image is displayed within a visual field frame 50a shown in FIG. 22 that corresponds to a display screen of FIG. 2. Then, a parallax correction mark 15c for N photography appears in the upper part of the screen (See FIGS. 20 and 21). On the screen, as shown in FIG. 20, a parallax correction mark 15d for P photography is hidden by the masks 16 and 16A and positioned outside the visual field frame. Therefore, the parallax correction mark 15d does not appear. Consequently, a photographer will not be misled by the correction mark 15d but can carry out N photography while checking the correction mark 15c alone.

Figure 23:
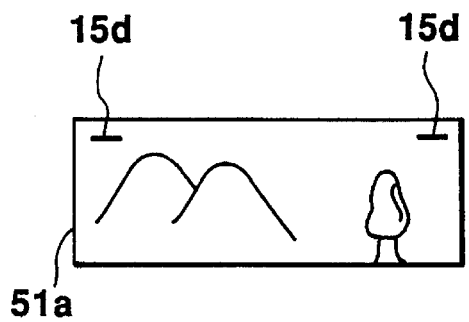
FIG. 23 shows a finder image display screen during P photography for the camera of FIG. 1.

Next, photographed picture sizes are switched, then the P photographing mode is specified. First, magnification varying lenses 11 and 12 of the finder optical system are moved to lie in a B state. With the movement, the finder image is enlarged from the size of a screen 50 (See FIG. 2) to that of an image formation plane 50A (See FIG. 3). At the same time, the visual field switching ring 13 turns, and the finder visual field masks 16 and 16A move to the position 16P for P photography. On the finder image display screen at this time, a finder image in the range of a display screen 51 shown in FIG. 4 comparable to the image formation plane 50A of FIG. 3 whose upper and lower parts are cut out or a visual field frame 51a shown in FIG. 23 is displayed. In the finder image, the parallax correction mark for P photography 15d alone is displayed at a given position as shown in FIG. 20. The parallax correction mark for N photography 15c is hidden by the masks 16 and 16A and positioned outside the visual field frame, which, therefore, is not displayed. A photographer can carry out P photography while paying attention to the correction mark for P photography 15d alone.

As described above, during N photography, the camera displays the parallax correction mark for N photography 15c within the finder image visual field frame, but does not display the parallax correction mark for P photography 15d. During P photography, the parallax correction mark for P photography 15d alone is displayed. Therefore, the finder is easy to see during P and N photography alike, reducing occurrence of a photographic error.

Figure 24:
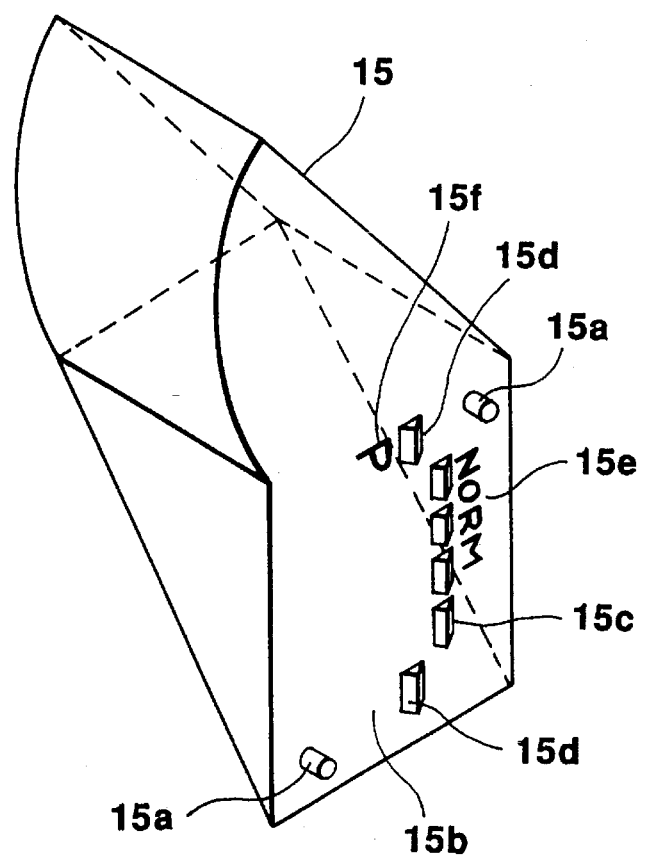
FIG. 24 is a perspective view of a variant of a Porro prism for the camera of the embodiment.
Figure 25:
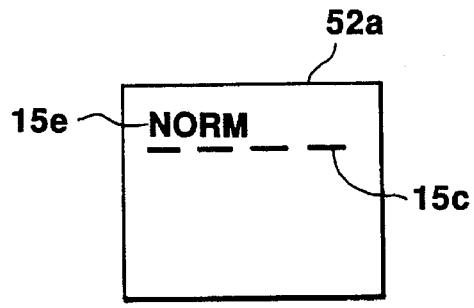
FIG. 25 shows a finder image display screen during N photography for a camera in which a Porro prism of a variant of FIG. 24 is installed.
Figure 26:
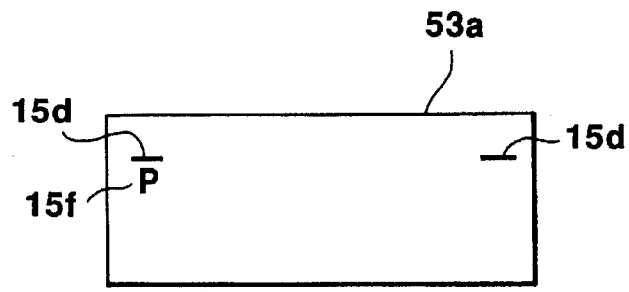
FIG. 26 shows a finder image display screen during P photography for a camera in which a Porro prism of a variant of FIG. 24 is installed.
Figure 27:
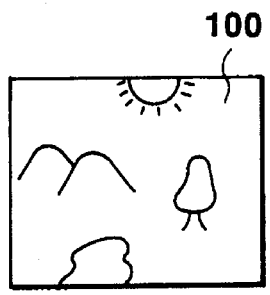
FIG. 27 shows an N-size picture for N photography in a conventional camera capable of photographing N-size and P-size pictures.
Figure 28:
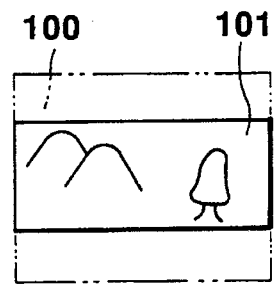
FIG. 28 shows a P-size picture for P photography in a camera capable of photographing N-size and P-size pictures shown in FIG. 27.
Figure 29:
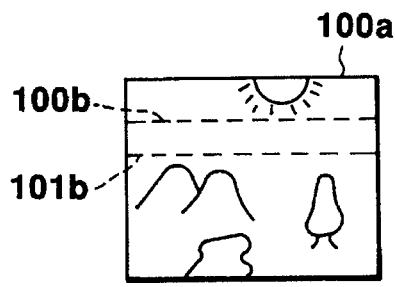
FIG. 29 shows a finder image display screen during N photography for the camera of FIG. 27.

In the camera of the aforesaid embodiment, the Porro prism 15 is provided with the parallax correction mark for N photography 15c and the parallax correction mark for P photography 15d. The Porro prism shown in FIG. 24 may be proposed as a variant, wherein an N photography indication mark "NORM" 15e is printed nearby the mark 15c and a P photography indication mark "P" 15f is printed nearby the mark 15d on the Porro prism 15A. According to the variant, during N photography, as shown in FIG. 25, the indication mark NORM 15e appears above the parallax correction mark 15c within the finder visual field frame 52a set in N photographing mode. During P photography, as shown in FIG. 26, the indication mark P 15f appears below the parallax correction mark 15d in the finder visual field frame 53a set in P photographing mode.

Thanks to the finder visual field frame 52a or 53a, the parallax correcting position in the finder is discernible and whether a picture being photographed is of the N size or of the P size is recognizable. This helps prevent a photographic error. Needless to say, identification marks other than the N and P photography indication marks may be displayed.

In the aforesaid embodiment, the visual field masks are driven mechanically to vary the size of the finder visual field. The drive may be, for example, based on electric signals. That is to say, liquid crystal display elements are divided into several sections and sections comparable to an observable range are selected with electric signals.

What is claimed is:

1. A camera having means for switching photographed picture sizes, comprising:

a variable magnification finder optical system capable of continuously varying observation magnification over a given range and means for changing a magnification in said range according to a selected photographed picture size;

a plurality of indicators, each associated with observation magnifications of said finder optical system and formed in regions which do not interfere with each other on an image formation plane of said finder optical system;

a finder visual field frame capable of presenting at least first and second different finder viewable visual field frame image sizes, said first image size having a width less than a width of said second image size and having a height greater than a height of said second image size; said first frame image size masking only one of said indicators and said second frame image size masking only a remaining one of the indicators, said finder visual field frame lying on an image formation plane of said finder optical system; and a finder visual field frame switching mechanism synchronous with switching of photographed picture sizes to optically project transmitted light having only indicators associated with a selected photographed picture size set among said plurality of indicators on said finder visual field frame and to optically block transmitted light having the remaining indicators of said plurality of indicators.

2. A camera capable of switching photographed picture sizes according to claim 1 wherein said photographed picture sizes to be switched are normal and panorama sizes.

3. A camera according to claim 1 further comprising:

an adjustable focal length photographing optical system capable of varying focal length continuously over a given range;

said finder optical system including means for continuously varying magnification over a given range responsive to a variation in the focal length of said photographing optical system.

4. A camera according to claim 1 wherein an indicator associated with said first visual field frame size is located at a position on said image formation frame which is in an increased height portion of said first visual frame size so as to be visible only when said first visual field frame size is selected and is not visible when said second visual field frame size is selected.

5. A camera according to claim 1 wherein an indicator associated with said second visual field frame size is located at a position on said image formation plane which is in an increased width portion of said second visual frame size so as to be visible only when said second visual field frame size is selected and is not visible when said first visual field frame size is selected.

6. A camera according to claim 1 wherein said first visual field frame size has a given width and a given height, said second visual field frame size reducing the height of said first visual field frame size by blocking marginal top and bottom portions of said first visual field frame size and increasing the width of said first visual field frame size by adding marginal viewing portions along left-hand and right-hand sides of said first visual field frame size;

said indication associated with said first visual field frame size being positioned in said image formation plane so as to be visible in one of said upper and lower marginal portions when said first visual field frame size is selected and is blocked from view when said second visual field frame size is selected.

7. A camera according to claim 1 wherein said indication associated with said second visual field frame size is positioned in said image formation plane so as to be visible in one of said left-hand and right-hand marginal portions when said second visual field frame size is selected and is blocked from view when said first visual field frame size is selected.

8. A camera having means for switching photographic picture sizes according to claim 1, wherein said indicators are presented in the viewfinder image and within a perimeter of their associated viewfinder image.

9. A camera having means for switching photographic picture sizes according to claim 1, wherein said indicators are parallax indicators and are located a predetermined distance below a top edge of the perimeter of their associated viewfinder image.

10. A camera having means for switching photographic picture sizes according to claim 1, wherein the distance between the top edge and the indicators marks for each image are different to facilitate parallax correction.

11. A camera capable of switching photographed picture sizes according claim 1 wherein said indicators are parallax correction indicators.

12. A camera capable of switching photographed picture sizes according to claim 11 wherein when said photographed picture sizes are switched to specify the panorama size, the observation magnification of said finder optical system is larger than that for the normal size.

13. A camera capable of switching photographed picture sizes according to claim 11 wherein said photographed picture sizes to be switched are normal and panorama sizes.

14. A camera capable of photographing a normal-size picture on film and a picture having different dimensions from the normal-size picture, comprising:

a picture size varying means for varying picture sizes;

a variable focal length photographing optical system;

an exposure opening member for a normal-size picture;

a picture size restricting member for providing a picture having a smaller height and a greater width than said normal-size picture;

means for switching the size of a picture on a film that interlocks said picture size restricting member in response to operation of said picture size varying means and switches between a normal-size picture and a picture smaller than the normal-size picture;

a finder member having a variable magnification optical system operable to continuously vary magnification over a magnification range;

a finder magnification switching means interlocking with said picture size switching means and increasing the finder magnification for said smaller than normal-size picture by a given value which is greater than the finder magnification for a normal-size picture;

a visual field switching means switching between a normal-size picture visual field and a small picture visual field and interlocking with said picture size varying means; and a near parallax correction marking means having a near parallax correction mark for said normal-size picture and a near parallax correction mark for said smaller than normal-size picture arranged at different locations within the finder optical system; whereby, for normal-size picture photography, said visual field switching means forms a normal-size picture viewable visual field within a finder, optically shielding said near parallax correction mark for a smaller than normal-size picture, and optically presenting said parallax correction mark for a normal-size picture within the finder, and for smaller than normal-size picture photography, said visual field switching means forms a small picture viewable visual field within the finder, optically shielding said near parallax correction mark for a normal-size picture, and optically presenting said near parallax correction mark for a smaller than normal-size picture within the finder.

15. A camera according to claim 14 wherein said finder member further comprises:

prism means for presenting an image of the scene being photographed;

said correction marks for said normal-size picture and said smaller than normal-size picture of said near parallax correction marking means being formed in said prism means;

said visual field switching means further comprising masking means for selectively shielding one of said parallax correction marks while presenting the other of said parallax correction marks in a finder image responsive to the picture size selected.

16. A camera according to claim 15 wherein said prism comprises first and second prism members;

said masking means being positioned between said first and second prism members;

said parallax correction marks being arranged along one of the prism members through which optical rays representing the image being observed by the finder pass in moving to a finder window whereby said correction marks are superimposed upon the image.

17. The camera according to claim 16 in which said parallax correcting marks comprise projections extending from a surface of one of said prism members.

18. The camera according to claim 16 in which said parallax correcting marks comprise cavities formed in a surface of one of said prism members.

19. A camera according to claim 16 wherein said prism is a Porro prism.

20. A camera according to claim 16 wherein said masking means comprises electrooptical masking means.

21. A camera according to claim 20 wherein said masking means includes liquid crystal display elements selected by electrical signals.

22. A camera capable of photographing a normal-size picture and a small picture having a smaller height than the normal-size picture, and having a photographing optical system capable of varying focal lengths and a finder for continuously varying finder magnification responsive to variation of focal length of the photographing optical system, comprising:

means for increasing finder magnification for said small picture greater by a given value than a finder magnification for a normal-size picture;

a visual field switching means for switching between a normal-size picture visual field and a small picture visual field said normal-size field being taller and narrower than said small field; and a near parallax correction marking means having a near parallax correction mark for said normal-size picture and a near parallax correction mark for said small picture arranged optically; whereby, for normal-size picture photography, said visual field switching means forms a normal-size picture visual field within a finder, optically shielding from view in said finder said near parallax correction mark for a small picture, and optically presenting in said finder said near parallax correction mark for a normal-size picture, and for a small picture, said visual field switching means forms a small picture visual field within the finder, optically shielding from view in said finder said near parallax correction mark for a normal-size picture, and optically presenting in said finder said near parallax correction mark for a small picture.

23. A camera capable of photographing a normal-size picture and a small picture having a smaller height than the normal-size picture, comprising:

a variable focal length photographing optical system;

a picture size switching means for selecting one of said normal-size and small picture;

a finder having a continuously variable zoom finder means or a means for increasing a finder magnification for a small picture photography by a given value higher than a finder magnification for a normal-size photography responsive to selection of a small-picture for photographing;

a visual filed switching means for switching between a normal-size picture viewable visual field and a small picture viewable visual field, said normal-size field being taller and narrower than said small size field; and a near parallax correction marking means having a near parallax correction mark for said normal-size picture and a near parallax correction mark for said small picture arranged at different positions in said finder; whereby, for normal-size picture photography, said visual field switching means forms a normal-size picture viewable visual field within a finder, optically shielding from view in said finder said near parallax correction mark for a small picture, and optically presenting in said finder said near parallax correction mark for a normal-size picture, and for small picture photography, said visual field switching means forms a small picture viewable visual field within the finder, optically shielding from view in said finder said near parallax correction mark for a normal-size picture, and optically presenting in said finder said near parallax correction mark for a small picture.

24. A camera according to claim 23 wherein a finder optical system includes a real image finder and has said near parallax correction marks arranged on the subject image formation plane of the real image finder.

25. A camera according to claim 23 wherein said near parallax correction marks are engraved directly on a focal plane forming an image formation plane.

26. A camera according to claim 25 wherein said near parallax correction marks on the image formation plane are convex or concave.

27. A camera capable of photographing a normal-size picture and a small picture having a smaller height than the normal-size picture, comprising;

a variable focal length photographing optical system;

a picture size switching means for selecting one of a normal-size and small picture;

a finder means having a continuously variable magnification optical system;

a finder magnification switching means for increasing the finder magnification for a small picture photography by a given value greater than the finder magnification for a normal-size photography responsive to selection of a small picture;

a visual field switching means for switching between a normal-size picture viewable visual field and a small picture viewable, said normal-Size field being taller and narrower than said small size field; and a near parallax correction marking means having a near parallax correction mark for said normal-size picture and a near parallax correction mark for said small picture arranged optically; whereby, for normal-size picture photography, said visual field switching means forms a normal-size picture viewable visual field within a finder, optically shielding from view in said finder said near parallax correction mark for a small picture, and optically presenting in said finder said near parallax correction mark for a normal-size picture, and for small picture photography, said visual field switching means forms a small picture viewable visual field within the finder, optically shielding from view in said finder said near parallax correction mark for a normal-size picture, and optically presenting in said finder said near parallax correction mark for a small picture.

28. A camera capable of photographing a normal-size picture and a small picture having different dimensions from the normal-size picture, comprising:

a variable focal length photographing optical system;

an exposure opening member for a normal-size picture;

a picture size restricting member for providing a small picture having a smaller height than said normal-size picture;

a picture size varying means interlocking said picture size restricting member and switching between a normal-size picture and a small picture;

a finder means having a continuously variable magnification optical system;

a finder magnification switching means for increasing the finder magnification for a small picture photography by a given value greater than the finder magnification for a normal-size photography responsive to selection of a small picture;

said finder means having visual field switching means for switching between a normal-size picture viewable visual field and a small picture viewable visual field, said normal-size field being taller and narrower than said small size field; and a near parallax correction marking means having a near parallax correction mark for said normal-size picture and a near parallax correction mark for said small picture arranged optically; whereby, for normal-size picture photography, said visual field switching means forms a normal-size picture viewable visual field within a finder, optically shielding from view in said finder said near parallax correction mark for a small picture, and optically presenting in said finder said near parallax correction mark for a normal-size picture, and for small picture photography, said visual field switching means forms a small picture viewable visual field within the finder, optically shielding from view in said finder said near parallax correction mark for a normal-size picture, and optically presenting in said finder said near parallax correction mark for a small picture.

29. A camera capable of switching between a normal-size picture and a small picture having a smaller height than the normal-size picture, having a photographing optical system and a finder for varying finder magnifications responsive to said switching, comprising:

a finder magnification switching means synchronous with switching of picture sizes to increase finder magnification for a small picture photography by a given value greater than a finder magnification for a normal-size photography;

a finder visual field switching means for switching between a normal-size picture finder viewable visual field and a small finder visual viewable field, said normal-size field being taller and narrower than said small size field;

a near parallax correction marking means having a near parallax correction mark for said normal-size picture and a near parallax correction mark for said small picture arranged optically; whereby, for normal-size picture photography, said visual field switching means forms a normal-size picture viewable visual field within a finder, optically shielding from view in said finder said near parallax correction mark for a small picture, and optically presenting in said finder said near parallax correction mark for a normal-size picture in the finder, and for small picture photography, said visual field switching means forms a small picture viewable visual field within the finder, optically shielding from view in said finder said near parallax correction mark for a normal-size picture, and optically presenting in said finder said near parallax correction mark for a small picture.

30. A method of selectively presenting parallax indicators for a camera capable of switching between a normal-size picture and a small picture which is smaller than said normal-size picture, said camera including a finder magnification optical system continuously variable over a given ranger adjustable picture size framing means and adjustable finder means for selectively presenting in a viewing window a viewable image having a normal-size and a small size corresponding to the selected picture size and having parallax markings associated with each picture size said normal-size being taller and narrower than said small size, said method comprising the steps of:

(a) adjusting the finder optical system magnification according to the picture size selected;

(b) moving the picture size framing means to change the size of said viewable image according to the desired picture size; and (c) masking with said framing means those parallax markings not associated with the selected picture size from presentation in the viewing window of the finder while presenting the parallax markings associated with the selected picture size in the finder viewing window responsive to the selected picture size.

31. The method of claim 30 wherein the masking step further comprises the step of:

presenting only one of the parallax markings in the viewing window in the form of a line extending across the image associated therewith; and presenting only another one of the parallax markings in the viewing window at only end portions of the image associated therewith.

32. The method of claim 30 wherein said camera further comprises:

a pair of masking members and said masking step further comprises moving said masking members in a manner so as to form a rectangular shaped image region having a first predetermined height and a first predetermined width to present said first size image; and moving said mask members in a second manner so as to form a rectangular-shaped image region having a second predetermined height and a second predetermined width to present said second size image, wherein said second height is less than said first height and said second width is greater than said first width.

33. The method of claim 30 wherein said camera is provided with a variable focal length taking lens system capable of moving between a wide angle and a telephoto condition and said finder magnification is variable over a range between a minimum and a maximum magnification value, said method further comprising the steps of:

adjusting the magnification of the finder optical system corresponding to the adjustment of the taking lens optical system between said wide angle and said telephoto settings.

34. The method of claim 33 wherein said finder magnification when using one of the image sizes is in the range of 1.1 to 1.4 times the finder magnification when using the other one of the image sizes.

35. The method of claim 33 further comprising the steps of:

limiting operation of the finder to a first portion of the magnification range when taking a small picture; and limiting operation of the finder over a second portion of the magnification range when taking a normal-size picture.

36. The method of claim 35 wherein said first and second portions of the magnification range at least partially overlap one another.

37. A camera having means for switching photographic picture sizes, comprising:

a variable magnification finder optical system capable of continuously varying observation magnification over a given range and means for changing magnification in said range according to a selected photographed picture size, said finder optical system being independent of and located a spaced distance from a photographing optical system;

a plurality of indicators associated with observation magnification of said finder optical system and formed in regions which do not interfere with each other on an image formation plane of said finder optical system in order to correct a parallax between the visual field ranges for a photographed picture and for a finder image;

a finder visual field frame presenting different finder viewable visual field frame image sizes synchronously with switching of photographed picture sizes, a first viewable frame size being taller and wider than a second visual frame size, said finder visual field frame lying on an image formation plane of said finder optical system; and a finder visual field frame switching mechanism synchronous with switching of photographed picture sizes for switching said finder visual field frame to present a different one of said first and second viewable visual field frame image sizes to thereby optically project transmitted light having only indicators associated with a selected photographed picture size set among said plurality of indicators on said finder visual field frame and to optically block transmitted light having the remaining indicators of said plurality of indicators.

38. A camera capable of switching a photographed picture size, comprising:

a real image type finder optical system comprising means for continuously varying an observation magnification according to a selected photographed picture size;

a plurality of indicators arranged on an image formation plane of said real image type finder optical system, said indicators comprising at least one first indicator associated with a first photographed picture size and at least one second indicator associated with a second photographed picture size;

a finder visual field frame arranged on an image formation plane of said real image type finder optical system agreeing or disagreeing with said indicators and forming at least two different finder visual fields, each having a predetermined viewable visual field defined at least in-part by view-blocking boundaries defining outermost viewable boundaries of each of said different finder visual fields; and a visual field frame switching mechanism for switching said finder visual field frame synchronously with changing a photographed picture size, said switching mechanism comprising switching means for moving at least one first outer view-blocking boundary defining at least a first outermost viewable boundary of said finder visual field frame to switch between a first size frame which is taller and narrower than a second size frame, thereby permitting said at least one first indicator to be viewed through said finder visual field frame and shielding said at least one second indicator so as to prevent viewing of said at least one second indicator through sad finder visual field frame when selecting the first size frame, and for moving at least one second outer view-blocking boundary defining at least a second outermost viewable boundary of said finder visual field frame, thereby permitting said at least one second indicator to be viewed through said finder visual field frame and shielding said at least one first indicator so as to prevent viewing of said at least one first indicator through said finder field frame when selecting the second size frame.

39. The camera according to claim 38, wherein said at least one member comprises means for permitting light to be projected onto said at least one selected indicator and means for shielding said at least one superfluous indicator to prevent light from being projected onto said at least one superfluous indicator.

40. The camera according to claim 38, wherein said at least one member comprises means for permitting said at least one selected indicator to be viewed through said viewable visual field according to said selected photographed picture size, and shielding said at least one superfluous indicator to prevent said at least one superfluous indicator from being viewed.

41. A camera capable of switching photographed pictures between a normal size and a panorama size, comprising:

a real image type finder optical system comprising means for continuously varying an observation magnification according to a selected photographed picture size;

a plurality of indicators arranged on an image formation plane of said real image type finder optical system, said indicators comprising at least one normal size indicator associated with a photographed picture size of said normal size and at least one panorama size indicator associated with a photographed picture size of said panorama size;

a finder visual field frame arranged on an image formation plane of said real image type finder optical system agreeing or disagreeing with selected ones of said indicators and defining a viewable finder visual field equal to said normal size or said panorama size whereby said panorama size is shorter and wider than said normal size; and a finder visual field frame switching mechanism for switching visual field frames synchronously with switching of photographed picture sizes, said switching mechanism comprising means for moving said finder visual field frame to define said viewable visual field to be one of said normal size and said panorama size, said switching means, synchronously with moving said finder visual field frame, permitting only one selected indicator to be viewed through said viewable visual field according to said selected photographed picture size, and shielding the other indicator to prevent said at least one superfluous indicator from being viewed.

42. The camera according to claim 41, wherein said finder visual field frame comprises means for permitting light to be projected onto said at least one selected indicator and means for shielding said at least one superfluous indicator so as to prevent light from being projected onto said at least one superfluous indicator.

43. The camera according to claim 41, wherein said finder visual field frame comprises means for permitting said only one selected indicator to be viewed through said viewable visual field according to said selected photographed picture size, and for shielding the other indicator to prevent said other indicator from being viewed.

44. The camera according to claim 41, wherein said indicators comprise parallax correction indicators.

45. The camera according to claim 41, wherein said indicators are presented on at least one of upper and lower ends of a normal-size visual field frame when said finder visual field frame is switched to a normal size, and said indicators are presented on at least one of right and left sides of a panorama-size visual field frame when said finder visual field frame is switched to a panorama size.

46. The camera according to claim 41, wherein an observation magnification of said finder optical system is larger when said photographed picture size is switched to a panorama size than when said photographed picture size is switched to a normal size.

47. A camera capable of switching a photographed picture size between a normal size and a panorama size, said panorama size having a height smaller than that of said normal size and a width larger than that of said normal size, said camera comprising:

a real image type finder optical system capable of varying observation magnification continuously according to a selected photographed picture size;

a plurality of indicators arranged at an image formation plane of said real image type finder optical system, said indicators being presented on at least one of upper and lower ends of a normal-size visual field frame when the photographed picture size is switched to a normal size, said indicators being presented on at least one of right and left sides of a panorama size visual field frame when the photographed picture size is switched to a panorama size;

a finder visual field frame arranged on an image formation plane of said real image type finder optical system agreeing or disagreeing with said indicators and defining a finder viewable visual field of said panorama size having a height smaller than and a width larger than that of said normal size; and a finder visual field frame switching mechanism for switching visual field frames synchronously with switching of photographed picture sizes, said switching mechanism comprising means for moving said finder visual field frame to define said viewable visual field to be equal to one of said normal size and said panorama size, said switching means, synchronously with moving said finder visual field frame, permitting at least one selected indicator to be viewed through said viewable visual field according to said selected photographed picture size, and shielding at least one superfluous indicator to prevent said at least one superfluous indicator from being viewed.

48. The camera according to claim 47, wherein said finder visual field frame comprises means for permitting light to be projected onto only one selected indicator and means for shielding the other indicator to prevent light from being projected onto said at least one superfluous indicator.

* * * * *